US010061666B1

(12) United States Patent
Natanzon et al.

(10) Patent No.: US 10,061,666 B1
(45) Date of Patent: Aug. 28, 2018

(54) METHOD AND APPARATUS FOR ADDING A DIRECTOR TO STORAGE WITH NETWORK-BASED REPLICATION WITHOUT DATA RESYNCHRONIZATION

(75) Inventors: Assaf Natanzon, Ramat Gan (IL); Saar Cohen, Mishmeret (IL)

(73) Assignee: EMC International Company, Hamilton (BM)

( * ) Notice: Subject to any disclaimer, the term of this patent is extended or adjusted under 35 U.S.C. 154(b) by 968 days.

(21) Appl. No.: 13/341,200

(22) Filed: Dec. 30, 2011

(51) Int. Cl.
*G06F 12/02* (2006.01)
*G06F 11/20* (2006.01)
*H04L 29/08* (2006.01)
*G06F 3/06* (2006.01)
*G06F 11/16* (2006.01)
*G06F 17/30* (2006.01)

(52) U.S. Cl.
CPC ........ *G06F 11/2056* (2013.01); *G06F 3/0632* (2013.01); *G06F 11/1662* (2013.01); *G06F 17/30194* (2013.01); *H04L 29/08549* (2013.01)

(58) Field of Classification Search
CPC .................. G06F 11/2074; G06F 11/1456
See application file for complete search history.

(56) References Cited

U.S. PATENT DOCUMENTS

| 6,735,636 B1 * | 5/2004 | Mokryn | G06F 13/4022 709/234 |
| 7,203,741 B2 | 4/2007 | Marco et al. | |
| 7,719,443 B1 | 5/2010 | Natanzon | |
| 7,840,536 B1 | 11/2010 | Ahal et al. | |
| 7,840,662 B1 | 11/2010 | Natanzon | |
| 7,844,856 B1 | 11/2010 | Ahal et al. | |
| 7,860,836 B1 | 12/2010 | Natanzon et al. | |
| 7,882,286 B1 | 2/2011 | Natanzon et al. | |
| 7,934,262 B1 | 4/2011 | Natanzon et al. | |
| 7,958,372 B1 | 6/2011 | Natanzon | |
| 8,024,534 B2 * | 9/2011 | Bartfai et al. | 711/162 |
| 8,037,162 B2 | 10/2011 | Marco et al. | |
| 8,041,940 B1 | 10/2011 | Natanzon et al. | |
| 8,060,713 B1 | 11/2011 | Natanzon | |
| 8,060,714 B1 | 11/2011 | Natanzon | |
| 8,103,937 B1 | 1/2012 | Natanzon et al. | |

(Continued)

*Primary Examiner* — Charles Rones
*Assistant Examiner* — Ryan Dare
(74) *Attorney, Agent, or Firm* — Daly, Crowley Mofford & Durkee, LLP

(57) ABSTRACT

In distributed storage environments (e.g., VPLEX®, from EMC Corporation) a director may be added while the distributed data is being replicated. However, the new director may have new splitters that do not know what to replicate and how to handle new I/Os. If I/Os are missed or lost, that information is gone forever and may be recovered only by a full resync of the volume. However, example embodiments of the present invention overcome these and other deficiencies by allowing adding a director and new splitters without interruption of the replication. Example embodiments of the present invention provide a method, an apparatus and a computer-program product for adding a director to storage with network-based replication without data resynchronization. The method includes obtaining distributed storage system node configuration information and performing replication in a network-based replication system according to the configuration information.

23 Claims, 12 Drawing Sheets

(56) References Cited

U.S. PATENT DOCUMENTS

| | | |
|---|---|---|
| 8,108,634 B1 | 1/2012 | Natanzon et al. |
| 8,214,612 B1 | 7/2012 | Natanzon |
| 8,250,149 B2 | 8/2012 | Marco et al. |
| 8,271,441 B1 | 9/2012 | Natanzon et al. |
| 8,271,447 B1 | 9/2012 | Natanzon et al. |
| 8,332,687 B1 | 12/2012 | Natanzon et al. |
| 8,335,761 B1 | 12/2012 | Natanzon |
| 8,335,771 B1 * | 12/2012 | Natanzon et al. ............ 707/684 |
| 8,341,115 B1 | 12/2012 | Natanzon et al. |
| 8,370,648 B1 | 2/2013 | Natanzon |
| 8,380,885 B1 | 2/2013 | Natanzon |
| 8,392,680 B1 | 3/2013 | Natanzon et al. |
| 8,429,362 B1 | 4/2013 | Natanzon et al. |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,510,279 B1 | 8/2013 | Natanzon et al. |
| 8,521,691 B1 | 8/2013 | Natanzon |
| 8,521,694 B1 | 8/2013 | Natanzon |
| 8,543,609 B1 | 9/2013 | Natanzon |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |
| 9,305,009 B1 | 4/2016 | Bono et al. |
| 9,323,750 B2 | 4/2016 | Natanzon et al. |
| 9,330,155 B1 | 5/2016 | Bono et al. |
| 9,336,094 B1 | 5/2016 | Wolfson et al. |
| 9,336,230 B1 | 5/2016 | Natanzon |
| 9,367,260 B1 | 6/2016 | Natanzon |
| 9,378,096 B1 | 6/2016 | Erel et al. |
| 9,378,219 B1 | 6/2016 | Bono et al. |
| 9,378,261 B1 | 6/2016 | Bono et al. |
| 9,383,937 B1 | 7/2016 | Frank et al. |
| 9,389,800 B1 | 7/2016 | Natanzon et al. |
| 9,405,481 B1 | 8/2016 | Cohen et al. |
| 9,405,684 B1 | 8/2016 | Derbeko et al. |
| 9,405,765 B1 | 8/2016 | Natanzon |
| 9,411,535 B1 | 8/2016 | Shemer et al. |
| 9,459,804 B1 | 10/2016 | Natanzon et al. |
| 9,460,028 B1 | 10/2016 | Raizen et al. |
| 9,471,579 B1 | 10/2016 | Natanzon |
| 9,477,407 B1 | 10/2016 | Marshak et al. |
| 9,501,542 B1 | 11/2016 | Natanzon |
| 9,507,732 B1 | 11/2016 | Natanzon et al. |
| 9,507,845 B1 | 11/2016 | Natanzon et al. |
| 9,514,138 B1 | 12/2016 | Natanzon et al. |
| 9,524,218 B1 | 12/2016 | Veprinsky et al. |
| 9,529,885 B1 | 12/2016 | Natanzon et al. |
| 9,535,800 B1 | 1/2017 | Natanzon et al. |
| 9,535,801 B1 | 1/2017 | Natanzon et al. |
| 9,547,459 B1 | 1/2017 | BenHanokh et al. |
| 9,547,591 B1 | 1/2017 | Natanzon et al. |
| 9,552,405 B1 | 1/2017 | Moore et al. |
| 9,557,921 B1 | 1/2017 | Cohen et al. |
| 9,557,925 B1 | 1/2017 | Natanzon |
| 9,563,517 B1 | 2/2017 | Natanzon et al. |
| 9,563,684 B1 | 2/2017 | Natanzon et al. |
| 9,575,851 B1 | 2/2017 | Natanzon et al. |
| 9,575,857 B1 | 2/2017 | Natanzon |
| 9,575,894 B1 | 2/2017 | Natanzon et al. |
| 9,582,382 B1 | 2/2017 | Natanzon et al. |
| 9,588,703 B1 | 3/2017 | Natanzon et al. |
| 9,588,847 B1 | 3/2017 | Natanzon et al. |
| 9,594,822 B1 | 3/2017 | Natanzon et al. |
| 9,600,377 B1 | 3/2017 | Cohen et al. |
| 9,619,543 B1 | 4/2017 | Natanzon et al. |
| 9,632,881 B1 | 4/2017 | Natanzon |
| 9,665,305 B1 | 5/2017 | Natanzon et al. |
| 9,710,177 B1 | 7/2017 | Natanzon |
| 9,720,618 B1 | 8/2017 | Panidis et al. |
| 9,722,788 B1 | 8/2017 | Natanzon et al. |
| 9,727,429 B1 | 8/2017 | Moore et al. |

(56) References Cited

U.S. PATENT DOCUMENTS

| | | |
|---|---|---|
| 9,733,969 B2 | 8/2017 | Derbeko et al. |
| 9,737,111 B2 | 8/2017 | Lustik |
| 9,740,572 B1 | 8/2017 | Natanzon et al. |
| 9,740,573 B1 | 8/2017 | Natanzon |
| 9,740,880 B1 | 8/2017 | Natanzon et al. |
| 9,749,300 B1 | 8/2017 | Cale et al. |
| 9,772,789 B1 | 9/2017 | Natanzon et al. |
| 9,798,472 B1 | 10/2017 | Natanzon et al. |
| 9,798,490 B1 | 10/2017 | Natanzon |
| 9,804,934 B1 | 10/2017 | Natanzon et al. |
| 9,811,431 B1 | 11/2017 | Natanzon et al. |
| 9,823,865 B1 | 11/2017 | Natanzon et al. |
| 9,823,973 B1 | 11/2017 | Natanzon |
| 9,832,261 B2 | 11/2017 | Don et al. |
| 9,846,698 B1 | 12/2017 | Panidis et al. |
| 9,875,042 B1 | 1/2018 | Natanzon et al. |
| 9,875,162 B1 | 1/2018 | Panidis et al. |

\* cited by examiner

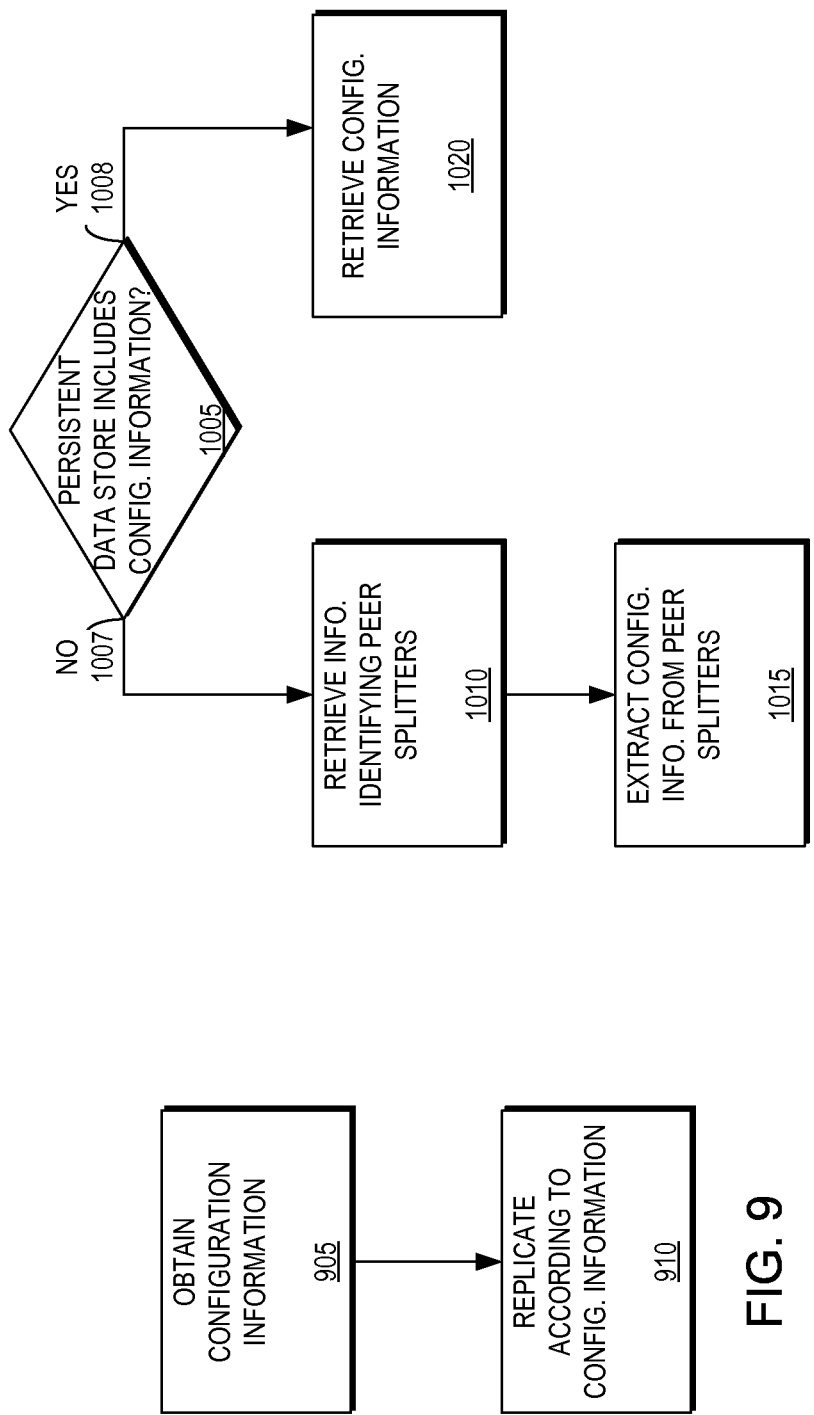

METHOD AND APPARATUS FOR ADDING A DIRECTOR TO STORAGE WITH NETWORK-BASED REPLICATION WITHOUT DATA RESYNCHRONIZATION

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to analyzing a computer network.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

SUMMARY

Example embodiments of the present invention provide a method, an apparatus and a computer-program product for adding a director to storage with network-based replication without data resynchronization. The method includes obtaining distributed storage system node configuration information and performing replication in a network-based replication system according to the configuration information.

BRIEF DESCRIPTION OF THE DRAWINGS

The above and further advantages of the present invention may be better under stood by referring to the following description taken into conjunction with the accompanying drawings in which:

FIG. 9 is a flow diagram illustrating an example method for adding new directors to storage with network-based replication without data resynchronization, in accordance with an embodiment of the present invention;

FIG. 10 is a flow diagram illustrating an example method for determining whether a persistent data store includes configuration information for a new node and manipulating configuration information, in accordance with an embodiment of the present invention;

DETAILED DESCRIPTION

Figure 1:
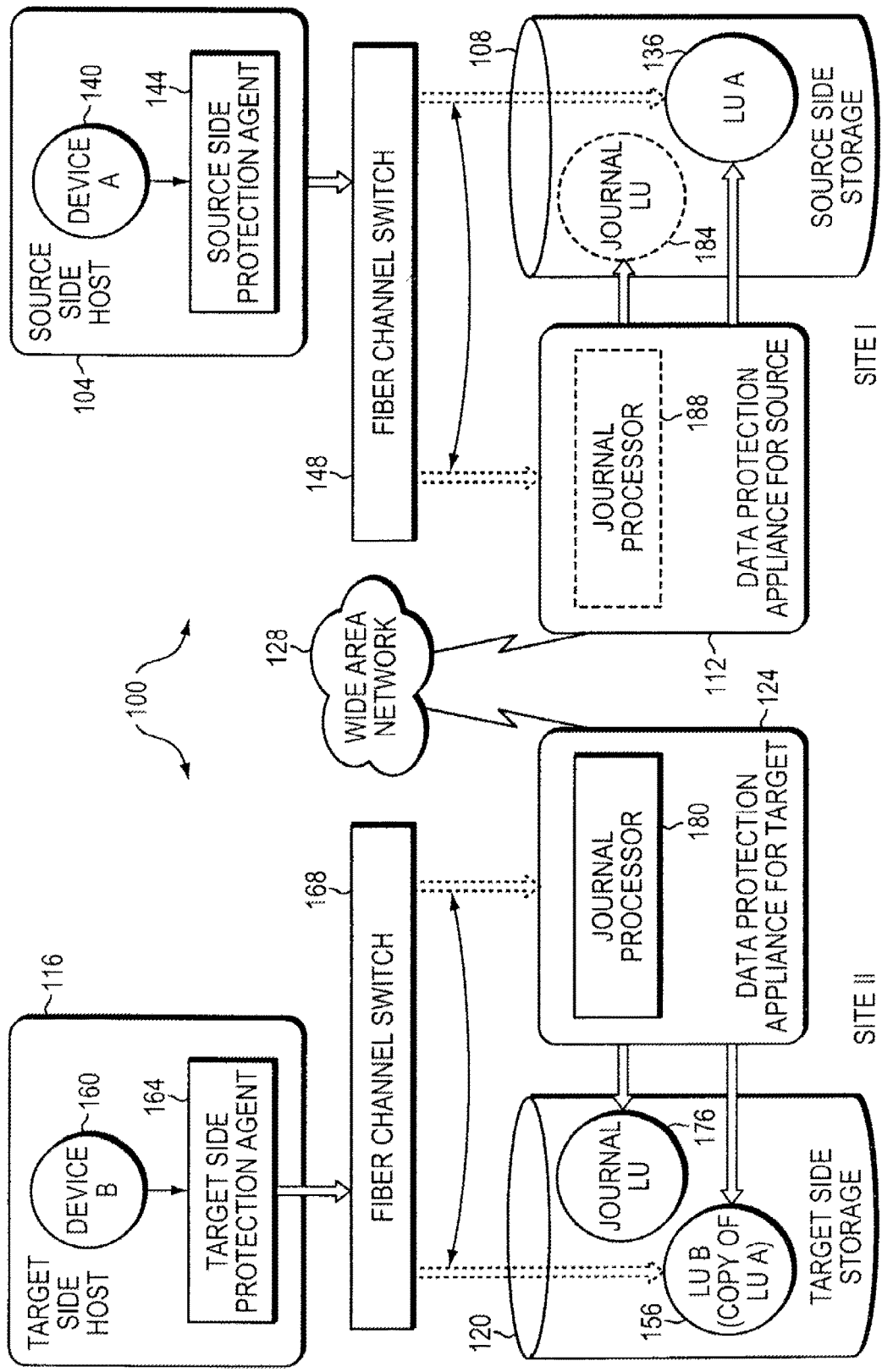
FIG. 1 is a simplified illustration of a data protection system, in accordance with an embodiment of the present invention.

The following definitions are employed throughout the specification and claims.

BACKUP SITE—a facility where replicated production site data is stored; the backup site may be located in a remote site or at the same location as the production site;

BLOCK VIRTUALIZATION—may be a layer which take back end storage volumes and, by slicing, concatenating and striping, creates a new set of volumes that serve as base volumes or devices in the virtualization layer;

CLONE—a clone may be a copy or clone of the image or images, drive or drives of a first location at a second location;

CONTINUOUS DATA PROTECTION (CDP)—may refer to a full replica of a volume or a set of volumes along with a journal which allows any point in time access, the CDP copy is at the same site, and may be in the same storage array as the production volume;

CONTINUOUS REMOTE REPLICATION (CRR)—may refer to a full replica of a volume or a set of volumes along with a journal which allows any point in time access at a site remote to the production volume and on a separate storage array;

DATA PROTECTION APPLIANCE (DPA)—a computer or a cluster of computers that serve as a data protection appliance, responsible for data protection services including inter alia data replication of a storage system, and journaling of I/O requests issued by a host computer to the storage system;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical;

DISTRIBUTED MIRROR—may be a mirror of a volume across a distance, either metro- or geo-, which is accessible at all sites;

FAIL ALL MODE—may be a mode of a volume in the splitter where all write and read I/Os intercepted by the splitter are failed to the host, but other SCSI command, like read capacity, are served;

GLOBAL FAIL ALL MODE—may be a mode of a volume in the virtual layer where all write and read I/Os to the virtual layer are failed to the host, but other SCSI commands, like read capacity, are served;

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

JOURNAL—a record of write transactions issued to a storage system; used to maintain a duplicate storage system, and to rollback the duplicate storage system to a previous point in time;

LOGGED ACCESS—may be an access method provided by the appliance and the splitter in which the appliance rolls the volumes of the consistency group to the point in time the user requested and let the host access the volumes in a copy on first write base;

LOGICAL UNIT—a logical entity provided by a storage system for accessing data from the storage system;

LUN—a logical unit number for identifying a logical unit;

MARKING ON SPLITTER—may be a mode in a splitter where intercepted I/Os are not split to an appliance and the storage, but rather changes (meta data) are tracked in a list and/or a bitmap and I/Os are sent immediately down the I/O stack;

PHYSICAL STORAGE UNIT—a physical entity, such as a disk or an array of disks, for storing data in storage locations that can be accessed by address;

PRODUCTION SITE—a facility where one or more host computers run data processing applications that write data to a storage system and read data from the storage system;

REPLICATION PROTECTION APPLIANCE (RPA)—another name for DPA;

SAN—a storage area network of nodes that send and receive I/O and other requests, each node in the network being an initiator or a target, or both an initiator and a target;

SOURCE SIDE—a transmitter of data within a data replication workflow, during normal operation a production site is the source side; and during data recovery a backup site is the source side;

SNAPSHOT—a Snapshot may refer to differential representations of an image, i.e. the snapshot may have pointers to the original volume, and may point to log volumes for changed locations. Snapshots may be combined into a snapshot array, which may represent different images over a time period;

SPLITTER/PROTECTION AGENT—may be an agent running either on a production host a switch or a storage array which can intercept IO and split them to a DPA and to the storage array, fail IO redirect IO or do any other manipulation to the IO;

STORAGE MEDIUM—may refer to one or more storage mediums such as a hard drive, a combination of hard drives, flash storage, combinations of flash storage, combinations of hard drives, flash, and other storage devices, and other types and combinations of computer readable storage mediums including those yet to be conceived; a storage medium may also refer both physical and logical storage mediums and may include multiple level of virtual to physical mappings and may be or include an image or disk image;

STORAGE SYSTEM—a SAN entity that provides multiple logical units for access by multiple SAN initiators;

TARGET—a node in a SAN that replies to I/O requests;

TARGET SIDE—a receiver of data within a data replication workflow; during normal operation a back site is the target side, and during data recovery a production site is the target side;

VIRTUAL ACCESS—may be an access method provided by the appliance and the splitter in which the appliance exposes a virtual volume from a specific point in time to the host, the data for the virtual volume is partially stored on the remote copy and partially stored on the journal;

VIRTUAL VOLUME—may be a volume which is exposed to a host by a virtualization layer and may span across more than one site; and WAN—a wide area network that connects local networks and enables them to communicate with one another, such as the Internet.

Description of Embodiments Using a Five State Journaling Process

FIG. 1 is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit;
Redirect the SCSI command to another logical unit;
Split the SCSI command by sending it first to the respective DPA. After the DPA returns an acknowledgement, send the SCSI command to its intended logical unit;
Fail a SCSI command by returning an error return code; and
Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 will host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
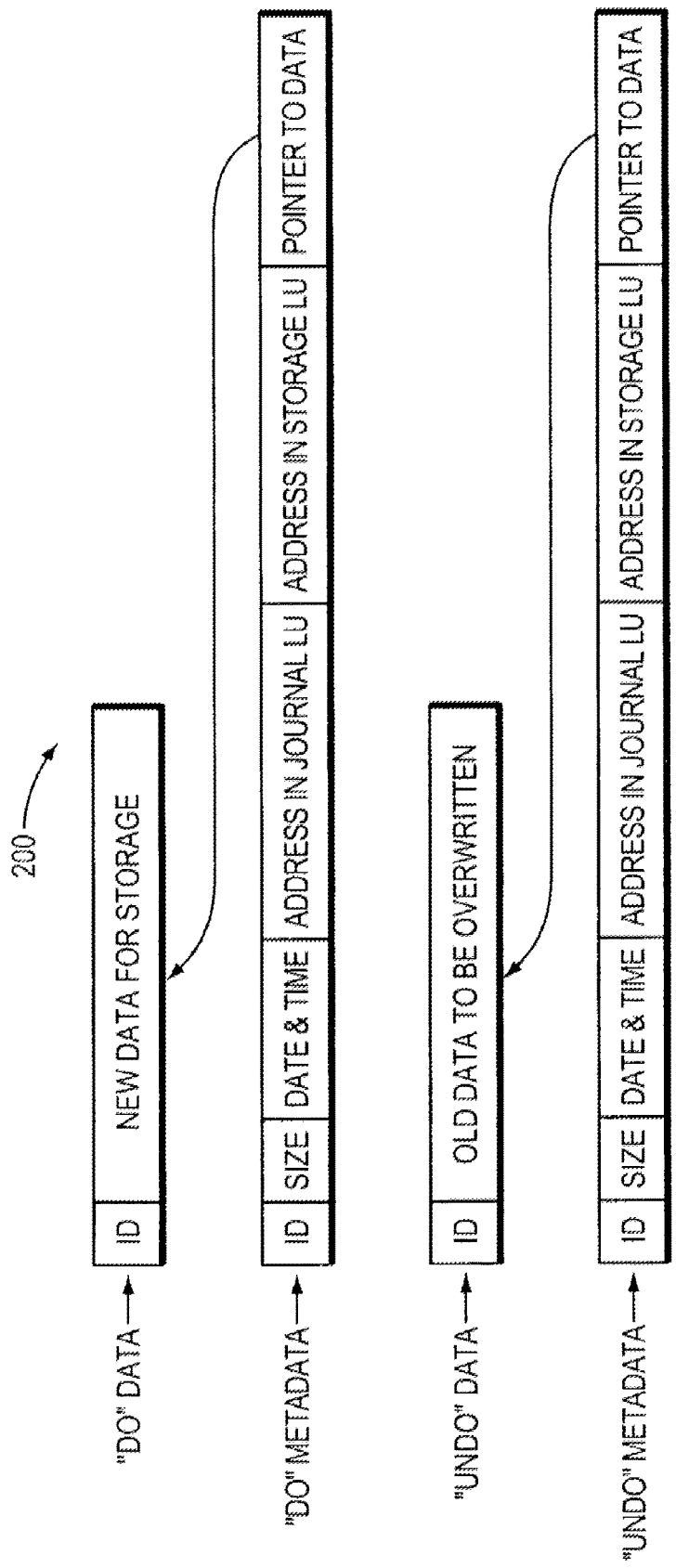
FIG. 2 is a simplified illustration of a write transaction for a journal, in accordance with an embodiment of the present invention.

FIG. 2 is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
  one or more identifiers;
  a time stamp, which is the date & time at which the transaction was received by source side DPA 112;
  a write size, which is the size of the data block;
  a location in journal LU 176 where the data is entered;
  a location in LU B where the data is to be written; and
  the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a pre-defined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Image Access

Herein, some information is provided for conventional continuous data protection systems having journaling and a replication splitter which may be used in one or more embodiments is provided. A replication may set refer to an association created between the source volume and the local and/or remote target volumes, and a consistency group contains one or more replication sets. A snapshot may be the difference between one consistent image of stored data and the next. The exact time for closing the snapshot may determined dynamically depending on replication policies and the journal of the consistency group.

In synchronous replication, each write may be a snapshot. When the snapshot is distributed to a replica, it may be stored in the journal volume, so that is it possible to revert to previous images by using the stored snapshots. As noted above, a splitter mirrors may write from an application server to LUNs being protected by the data protection appliance. When a write is requested from the application server it may be split and sent to the appliance using a host splitter/driver (residing in the I/O stack, below any file system and volume manager, and just above any multipath driver (such as EMC POWERPATH), through an intelligent fabric switch, through array-based splitter, such as EMC CLARiiON.

There may be a number of image access modes. Image access may be used to restore production from the disaster recovery site, and to roll back to a previous state of the data. Image access may be also to temporarily operate systems from a replicated copy while maintenance work is carried out on the production site and to fail over to the replica. When image access is enabled, host applications at the copy site may be able to access the replica.

In virtual access, the system may create the image selected in a separate virtual LUN within the data protection appliance. While performance may be constrained by the appliance, access to the point-in-time image may be nearly instantaneous. The image may be used in the same way as logged access (physical), noting that data changes are temporary and stored in the local journal. Generally, this type of image access is chosen because the user may not be sure which image, or point in time is needed. The user may access several images to conduct forensics and determine which replica is required. Note that in known systems, one cannot recover the production site from a virtual image since the virtual image is temporary. Generally, when analysis on the virtual image is completed, the choice is made to disable image access.

If it is determined the image should be maintained, then access may be changed to logged access using 'roll to image.' When disable image access is disabled, the virtual LUN and all writes to it may be discarded.

In an embodiment of virtual access with roll image in background, the system first creates the image in a virtual volume managed by the data protection appliance to provide rapid access to the image, the same as in virtual access. Simultaneously in background, the system may roll to the physical image. Once the system has completed this action, the virtual volume may be discarded, and the physical volume may take its place. At this point, the system continues to function as if logged image access was initially selected. The switch from virtual to physical may be transparent to the servers and applications and the user may not see any difference in access. Once this occurs, changes may be read from the physical volume instead of being performed by the appliance. If image access is disabled, the writes to the volume while image access was enabled may be rolled back (undone). Then distribution to storage may continue from the accessed image forward.

In some embodiments in physical logged access, the system rolls backward (or forward) to the selected snapshot (point in time). There may be a delay while the successive snapshots are applied to the replica image to create the selected image. The length of delay may depend on how far the selected snapshot is from the snapshot currently being distributed to storage. Once the access is enabled, hosts may read data directly from the volume and writes may be handled through the DPA. The host may read the undo data of the write and the appliance may store the undo data in a logged access journal. During logged access the distribution of snapshots from the journal to storage may be paused. When image access is disabled, writes to the volume while image access was enabled (tracked in the logged access journal) may be rolled back (undone). Then distribution to storage may continue from the accessed snapshot forward.

Disable image access may mean changes to the replica may be discarded or thrown away. It may not matter what type of access was initiated, that is, logged or another type, or whether the image chosen was the latest or an image back in time. Disable image access effectively says the work done at the disaster recovery site is no longer needed.

Delta Marking

A delta marker stream may contain the locations that may be different between the latest I/O data which arrived to the remote side (the current remote site) and the latest I/O data which arrived at the local side. In particular, the delta marking stream may include metadata of the differences between the source side and the target side. For example, every I/O reaching the data protection appliance for the source 112 may be written to the delta marking stream and data is freed from the delta marking stream when the data safely arrives at both the source volume of replication 108 and the remote journal 180 (e.g. DO stream). Specifically, during an initialization process no data may be freed from the delta marking stream; and only when the initialization process is completed and I/O data has arrived to both local storage and the remote journal data, may be I/O data from the delta marking stream freed. When the source and target are not synchronized, data may not be freed from the delta marking stream. The initialization process may start by merging delta marking streams of the target and the source so that the delta marking stream includes a list of all different locations between local and remote sites. For example, a delta marking stream at the target might have data too if a user has accessed an image at the target site.

The initialization process may create one virtual disk out of all the available user volumes. The virtual space may be divided into a selected number of portions depending upon the amount of data needed to be synchronized. A list of 'dirty' blocks may be read from the delta marker stream that is relevant to the area currently being synchronized to enable creation of a dirty location data structure. The system may begin synchronizing units of data, where a unit of data is a constant amount of dirty data, e.g., a data that needs to be synchronized.

The dirty location data structure may provide a list of dirty location until the amount of dirty location is equal to the unit size or until there is no data left. The system may begin a so-called ping pong process to synchronize the data. The process may transfer the differences between the production and replica site to the replica.

A discussion of mirroring may be found in U.S. Pat. No. 7,346,805, entitled "PROTECTION OF MIRRORED DATA," issued on Mar. 18, 2008 and assigned to EMC Corporation of Hopkinton, Mass., which is hereby incorporated by reference in its entirety.

A discussion of journaling and some techniques associated with journaling may be found in U.S. Pat. No. 7,516,287, entitled "METHODS AND APPARATUS FOR OPTIMAL JOURNALING FOR CONTINUOUS DATA REPLICATION," issued on Apr. 7, 2009 and assigned to EMC Corporation of Hopkinton, Mass., which is hereby incorporated by reference in its entirety.

A discussion of dynamically adding storage for a journal may be found in U.S. Pat. No. 7,840,536, entitled "METHODS AND APPARATUS FOR DYNAMIC JOURNAL EXPANSION," issued on Nov. 23, 2010 and assigned to EMC Corporation of Hopkinton, Mass., which is hereby incorporated by reference in its entirety.

Virtual Service Layer

Typical server environments have one or more hosts access storage. Conventionally, some of the hosts may be virtual hosts or virtual machines. Generally, each virtual machine or host has a LUN or logical unit corresponding to storage space it may access. Typically, this LUN corresponds to a portion of one or more physical disks mapped to the LUN or logical drive.

Conventional Server virtualization products may have developed the capability to execute migrations of virtual machines, the underlying storage, or both to address load balancing and high availability requirements with certain limitations. Typically, conventional solutions usually require disruptive failover (i.e. failure of one site to transfer the processes to the back-up site), merged SANs, and do not work with heterogeneous products. Thus, in typical systems, if a Virtual Machine were migrated to another environment, such as a server at another location outside of a site, the virtual machine would no longer have read write access to the LUN. However, it is desirable to be able to migrate a virtual machine and have it still be able to have read write access to the underlying storage.

In certain embodiments of the instant disclosure, storage resources are enabled to be aggregated and virtualized to provide a dynamic storage infrastructure to complement the dynamic virtual server infrastructure. In an embodiment of the current invention, users are enabled to access a single copy of data at different geographical locations concurrently, enabling a transparent migration of running virtual machines between data centers. In some embodiments, this capability may enable for transparent load sharing between multiple sites while providing the flexibility of migrating workloads between sites in anticipation of planned events. In other embodiments, in case of an unplanned event that causes disruption of services at one of the data centers, the failed services may be restarted at the surviving site with minimal effort while minimizing recovery time objective (RTO).

In some embodiments of the current techniques the IT infrastructure including servers, storage, and networks may be virtualized. In certain embodiments, resources may be presented as a uniform set of elements in the virtual environment. In other embodiments of the current techniques local and distributed federation is enabled which may allow transparent cooperation of physical data elements within a single site or two geographically separated sites. In some embodiments, the federation capabilities may enable collection of the heterogeneous data storage solutions at a physical site and present the storage as a pool of resources. In some embodiments, virtual storage is enabled to span multiple data centers In some embodiments, virtual storage or a virtual storage layer may have a front end and a back end. The back end may consume storage volumes and create virtual volumes from the consumed volumes. The virtual volumes may be made up of portions or concatenations of the consumed volumes. For example, the virtual volumes may stripped across the consumed volumes or may be made up of consumed volumes running a flavor of RAID. Usually, the front-end exposes these volumes to hosts.

An example embodiment of a virtual service layer or virtual service appliance is EMC Corporation's VPLEX®. In some embodiments of the instant disclosure, a storage virtualization appliance has a back-end exposes LUNs to hosts and a front-end which talks to storage arrays, which may enable data mobility. In certain embodiments, storage may be added or removed from the virtual service layer transparently to the user In most embodiments, the virtual service layer enables cache coherency. Thus, in certain embodiments of the current techniques, the storage volumes, in a virtualized server environment, which comprise the encapsulation of a virtual machine may be coherently co-located in two sites, enabling simultaneous, local access by the virtual machine regardless of whether the virtual machine is located on the local or remote site. In other embodiments, cooperative clustering of the virtualization server nodes may allow for active/active, concurrent read/write access to one or more federated storage devices across the sites. In further embodiments, concurrent access may occur even if the data has not yet been fully copied between the two sites. In at least some embodiments of the current techniques, it is enabled to reference the source copy in this case, preserving seamless, continuous operation.

In certain embodiments of the current disclosure, movement of the virtual machines between the two sites is facilitated. In some embodiments, LUN level access is active/active, any single virtual machine may execute on only one node of the cluster. In further embodiments, enabling of migration of virtual machine instances may enable the migration of the I/O load (specifically read workloads) to storage devices located in the site where the active node resides for any given virtual machine.

In some embodiments of the current techniques, the ability to migrate a VM may be enabled through the use of one or more federated virtual volume. In certain embodiments, a virtual machine or application may communicate through a network with a module which presents virtual volumes to the application or virtual machine. In further embodiments the network may be a SAN. In at least some embodiments, this module may provide a level of abstraction between the storage and the requests for storage made by a virtual machine or other application. In these embodiments, the module may map the logical drive presented to the VM or application to the storage device. In certain embodiments, the module may be transparent to the storage request, the application or VM functioning as it is accessing a logical drive across a network. In other embodiments the network may be a SAN. In other embodiments, regardless of location of the VM, the VM may attempt to reach the LUN provided by the module, which may map the VM request to the appropriate storage.

In some embodiments of the current invention, a clustering architecture enables servers at multiple data centers to have concurrent read and write access to shared block storage devices. In alternative embodiments of the current invention, load sharing between multiple sites while providing the flexibility of migrating workloads between sites in anticipation of planned events such as hardware maintenance is enabled. In further embodiments, in case of an unplanned event that causes disruption of services at one of the data centers, the failed services may be quickly and easily restarted at the surviving site with minimal effort.

In most embodiments, the module may communicate with a second module at the second site to facilitate the one or more federated logical drive. In some embodiments, if a VM were to be moved from the first site to the second site the VM would attempt to access storage through the second module. In most embodiments, the move would be transparent to the VM as it would simply reach out to access the storage and the module on the second site would re-direct the request to the storage on the second site. In some embodiments, the module on the second site would direct the request to the data on the second site. In some embodiments, the storage may be kept in sync using a mirror, the VM may access a current version of the data, regardless of on which site the VM is located. The modules at the first and second site may be in communication with each other.

In some embodiments, disparate storage arrays at two separate locations may be enabled to appear as a single, shared array to application hosts, allowing for the easy migration and planned relocation of application servers and application data, whether physical or virtual. In other embodiments, effective information distribution by sharing and pooling storage resources across multiple hosts may enabled. In further embodiments, manage of virtual environment may be enabled to transparently share and balance resources across physical data centers, ensure instant, real-time data access for remote users, increase protection to reduce unplanned application outages, and transparently share and balance resources within and across physical data centers.

In further embodiments, concurrent read and write access to data by multiple hosts across two locations may be enabled. In other embodiments, realtime data access to remote physical data centers without local storage may be enabled. In some embodiments, the virtual service layer may be implemented by EMC's VPLEX® or the like.

Figure 3:
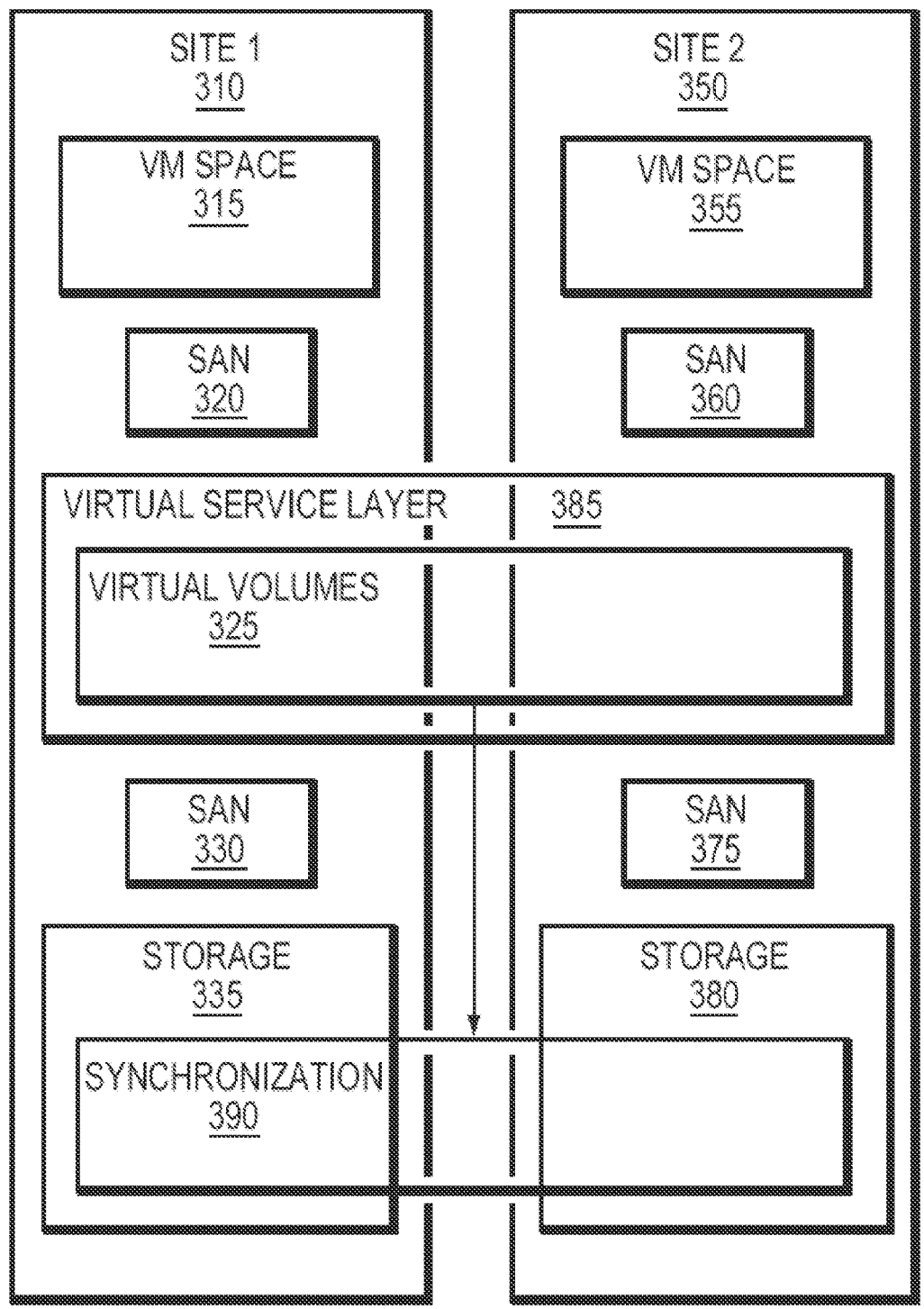
FIG. 3 is a simplified illustration of sites with a virtual service layer, in accordance with an embodiment of the present invention.

Refer to the example embodiment of a virtual service layer of FIG. 3. In the embodiment of FIG. 3, there are two sites 310, 350. Each site has a respective VM space or a space able to run virtual machine, 315, 355, SANs, 320, 330, 360, and 375 and storage 335, 380, respectively. The two sites also have a virtual service later 385, which presents virtual volumes 325. The synchronization 390 of the storage 335 is provided by the virtual service layer 385. In the embodiment of FIG. 3, the same virtual volume may be exposed via the virtual service layer 385. This volume may be kept synchronized so that any VM in VM Space 315 or VM in VM Space 355 accesses the same virtual volume with the same data regardless of in which VM Space, 315, 355, the VM resides.

In some embodiments of the current disclosure, replication and data mobility may be enabled at difference geographic sites. In certain embodiments, this may be enabled by cache coherency functionality. In at least some embodiments, the cache coherency may enable data to be consistent over large distances and be able to be accessed at both geo sites. In a particular embodiment, there may be two geo sites. In this embodiment, if a read is performed on an area of the storage that does not belong to the local site, the read may be delayed and the read may be performed on the remote site. In this embodiment, if a read is performed on an area owned by the local site, then the read may be performed on the local site.

In other embodiments, the geo sites may enforce a write order fidelity mechanism (WOFM) by periodically quiescing or stopping the storage and ensure that the replicated data is consistent. In these embodiments, a checkpoint may be created at each site. In these embodiments, this checkpoint may be transmitted to the other site. In these embodiments, the other site may flush this checkpoint in order to ensure it has the data as the other site. In these embodiments, only consistent data may be written to the other site. In these embodiments, if a site crashes, then both sites are ensured to have a point in time, where both sites have the same data.

A discussion of dynamically adding storage for a journal may be found in U.S. Pat. No. 7,840,536, entitled "METHODS AND APPARATUS FOR DYNAMIC JOURNAL EXPANSION," issued on Nov. 23, 2010 and assigned to EMC Corporation of Hopkinton, Mass., which is hereby incorporated by reference in its entirety.

A discussion of some types of virtual storage may be found in U.S. Pat. No. 7,206,863, entitled "SYSTEM AND METHOD FOR MANAGING STORAGE NETWORKS AND PROVIDING VIRTUALIZATION OF RESOURCES IN SUCH A NETWORK," issued on Apr. 17, 2007; U.S. Pat. No. 7,770,059, entitled "FAILURE PROTECTION IN AN ENVIRONMENT INCLUDING VIRTUALIZATION OF NETWORKED STORAGE RESOURCES," issued on Aug. 3, 2010; U.S. Pat. No. 7,739,448, entitled "SYSTEM AND METHOD FOR MANAGING STORAGE NETWORKS AND PROVIDING VIRTUALIZATION OF RESOURCES IN SUCH A NETWORK," issued on Jun. 15, 2010; U.S. Pat. No. 7,739,448, entitled "SYSTEM AND METHOD FOR MANAGING STORAGE NETWORKS AND PROVIDING VIRTUALIZATION OF RESOURCES IN SUCH A NETWORK USING ONE OR MORE ASICS," issued on Nov. 17, 2009; U.S. Pat. No. 7,620,774, entitled "SYSTEM AND METHOD FOR MANAGING STORAGE NETWORKS AND PROVIDING VIRTUALIZATION OF RESOURCES IN SUCH A NETWORK USING ONE OR MORE CONTROL PATH CONTROLLERS WITH AN EMBEDDED ASIC ON EACH CONTROLLER," issued on Nov. 17, 2009, U.S. Pat. No. 7,225,317, entitled "SYSTEM AND METHOD FOR MANAGING STORAGE NETWORKS AND FOR MANAGING SCALABILITY OF VOLUMES IN SUCH A NETWORK," issued on May 29, 2007; U.S. Pat. No. 7,315,914, entitled "SYSTEMS AND METHODS FOR MANAGING VIRTUALIZED LOGICAL UNITS USING VENDOR SPECIFIC STORAGE ARRAY COMMANDS," issued on Jan. 1, 2008; and U.S. Pat. No. 7,216,264, entitled "SYSTEM AND METHOD FOR MANAGING STORAGE NETWORKS AND FOR HANDLING ERRORS IN SUCH A NETWORK," issued on May 8, 2007, all of which are assigned to EMC Corporation of Hopkinton, Mass. and hereby incorporated by reference in their entirety.

Journal Based Replication in a Virtual Storage Layer with a Splitter

In some embodiments of the instant disclosure, a virtual service layer may have journal based replication. In certain embodiments of the instant disclosure, data consistency between different sites serviced by a virtual service layer may be ensured. In most embodiments, one or more splitter may be integrated into the virtual service layer.

Figure 4:
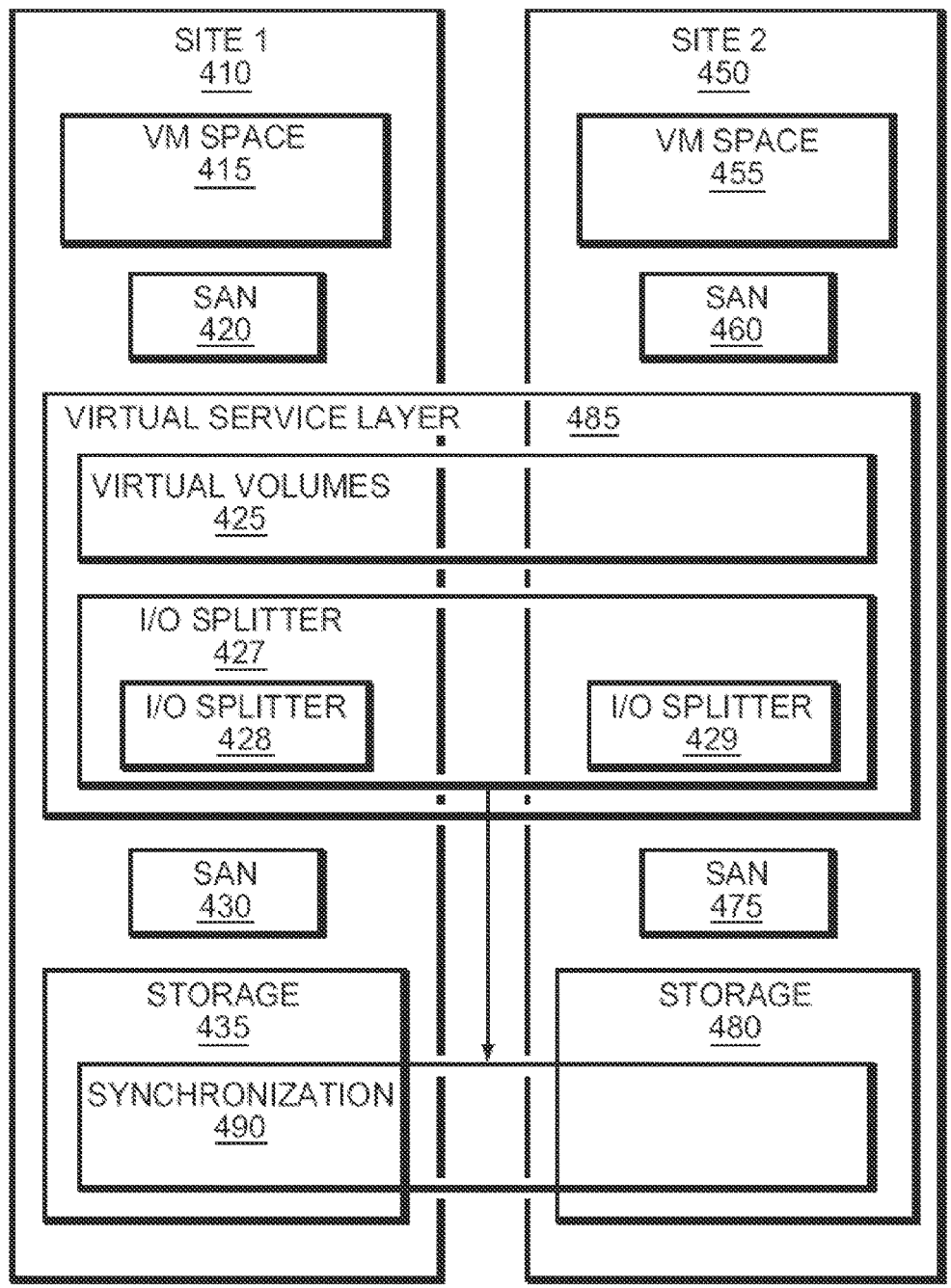
FIG. 4 is an alternative simplified illustration of a virtual service layer with an I/O splitter, in accordance with an embodiment of the present invention.

Refer now to the example embodiment of FIG. 4. In the embodiment of FIG. 4, an I/O splitter has been inserted into the Virtual Service Layer. In these embodiments, the splitter 427 may split I/O occurring at the virtual service layer 485. The I/O Splitter may be made up of one or more splitters in each node at each site. In the example embodiment of FIG. 4, there is one node at each site 410 and 450 and there is one splitter 428, 429, respectively, for each site 410, 450.

Figure 5:
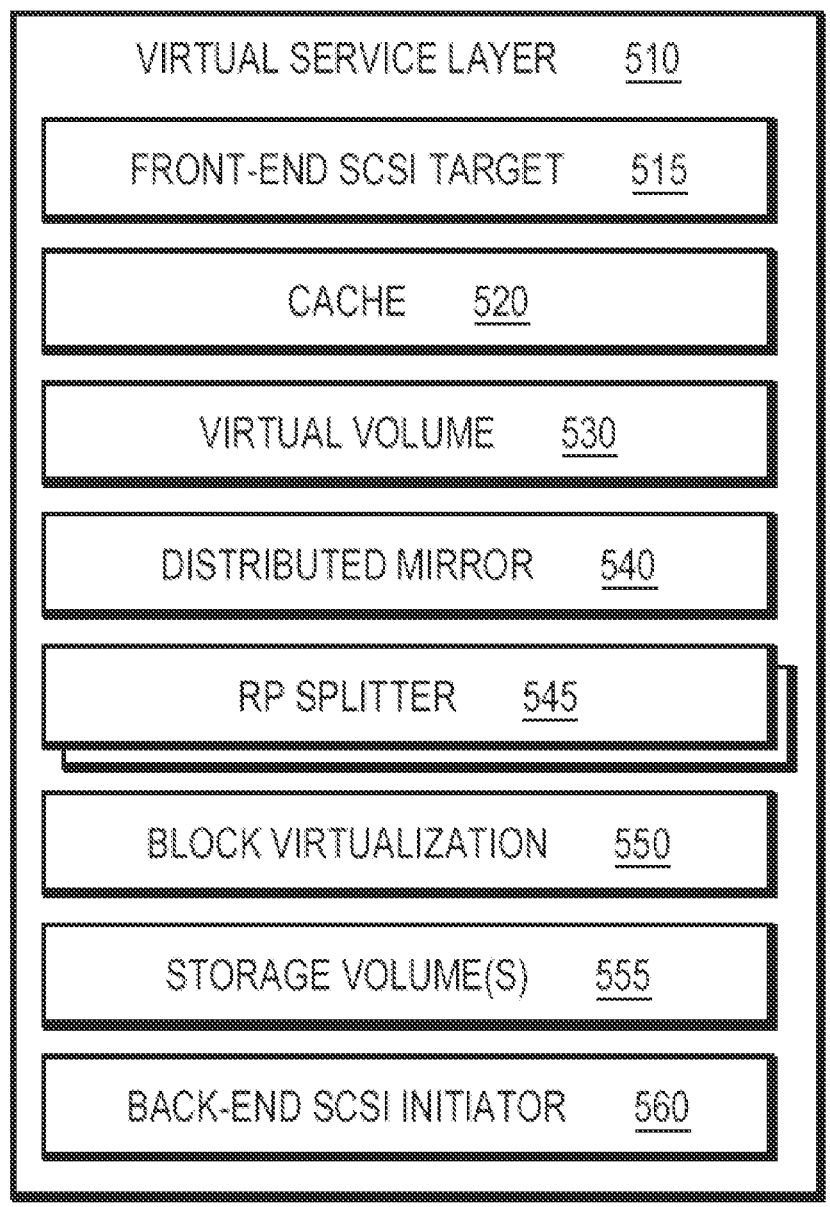
FIG. 5 is a simplified illustration of an implementation of a virtual service layer, in accordance with an embodiment of the present invention.

Refer now to the exemplary embodiment of FIG. 5. The example embodiment of FIG. 5 illustrates a sample virtual service layer divided into underlying layers. In FIG. 5, the Virtual Service Layer 510 has a front-end SCSI target 515 that may be exposed to a host. In FIG. 5, there is also a cache 520. In some embodiments the cache may be a write-through cache. In other embodiments it may be a write-order fidelity cache. In FIG. 5, there is also a virtual volume 530 also exposed to a host or several hosts. The virtual volume may be supported by a distributed mirror 540. A distributed mirror may be a mirror which gives a remote active copy of the volume that is mirrored at another site. The distributed mirror enables mirroring between two geographically disparate sites. There may be a splitter 545 inserted between the virtual volume 530 and the block virtualization 550. As well, there may also be storage volume 555 and a back-end SCSI initiator 560.

Figure 6:
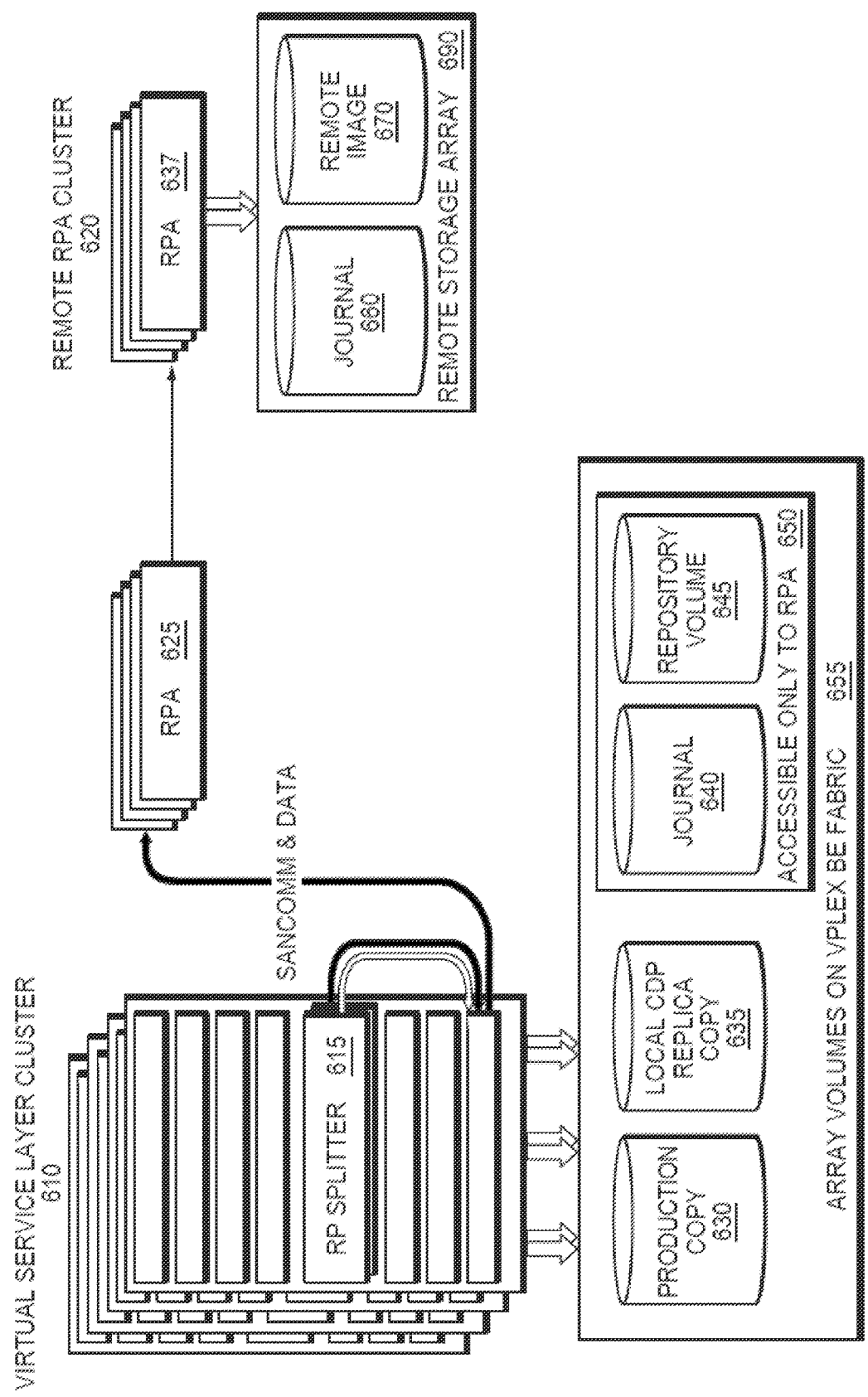
FIG. 6 is a simplified illustration of an implementation of a virtual service layer with a splitter and recovery appliance, in accordance with an embodiment of the present invention.

Refer now to the example embodiment of FIG. 6. In this example embodiment, splitter 615 communicates with recovery appliance 625. In some embodiments, the appliance may alternatively be set of process running inside the virtual service cluster. Splitter 615 splits the I/O in the virtual service layer and sends the I/O to recovery appliance 625 and to the block virtualization layer. The recovery appliance 625 may keep journal 640 of the I/O and may also keep a repository volume 645, for persistent configuration, and may keep a copy of the production image 635 serviced by the Virtual service layer 610. Journal 640 and repository 645 volumes may be served from virtual service layer 610 or from a backend array directly. The appliance may also transfer the data to remote site 620 and create a remote copy of the data in a different storage array.

Figure 7:
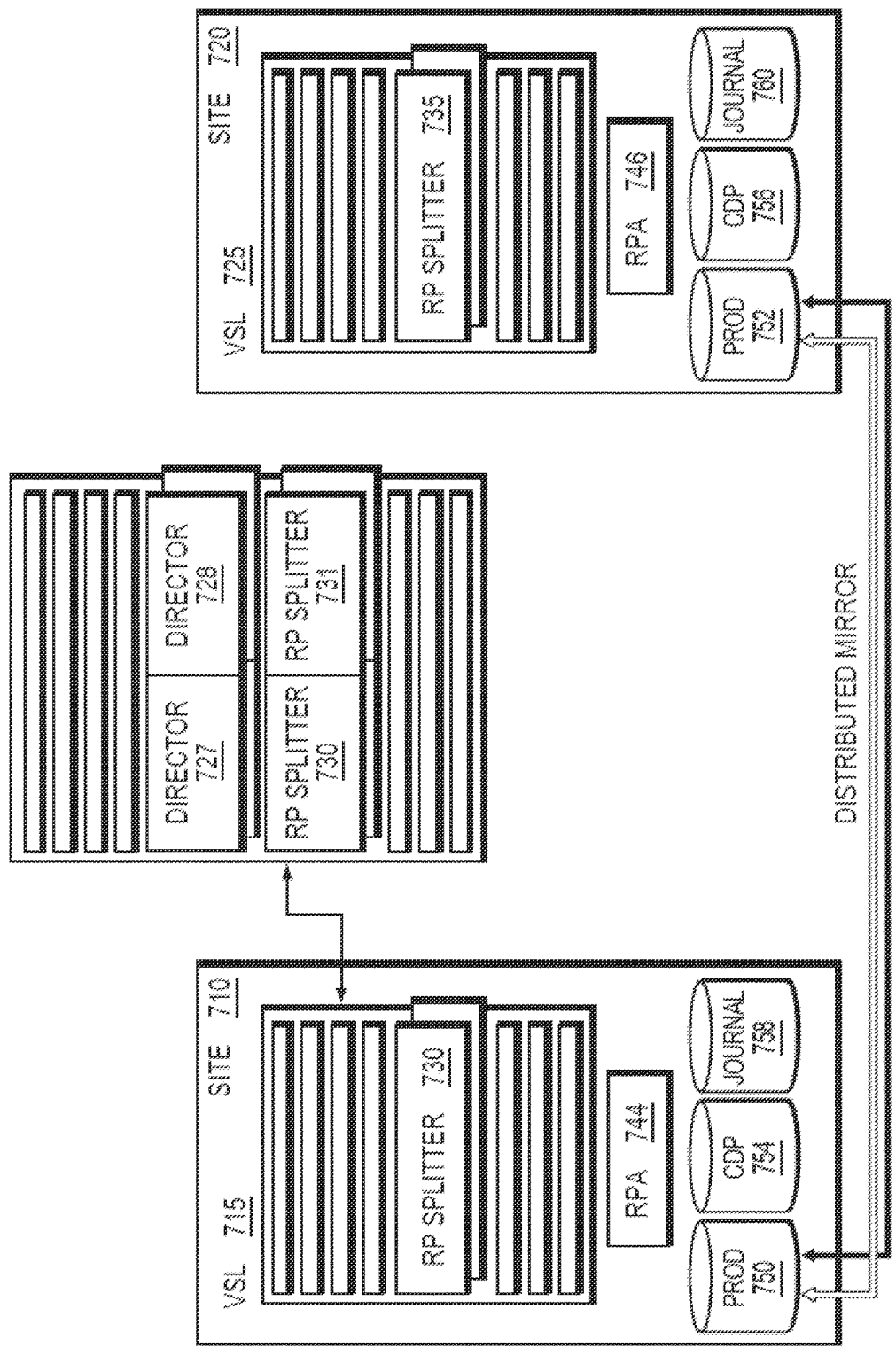
FIG. 7 is a simplified illustration of an implementation of two sites with a virtual service layer, splitters and recovery appliances, in accordance with an embodiment of the present invention.

Refer now to the example embodiment of FIG. 7. In the example embodiment of FIG. 7, sites 710 and 720 have virtual service layers 715, 725 and each VSL has a splitter, 730, and 735. The Virtual Volumes or production volumes 750 and 752 are distributed mirrors and kept consistent across sites 710, 720. Each IO performed at site 710 may be transmitted to site 720. In this example, both splitters, 730, 735 may intercept the same I/O and the same I/O may be intercepted twice. At site 710 and 720, there may be multiple directors such as directors 727 and 728. A director may be a construct that exposes the LUNs in the storage. Two directors may form a construct called an engine. Each director 727, 728 in VSL 715 may have a splitter 730, 731. All the directors at each site may expose the LUNs to hosts, the host may send each IO to one of the directors (for load balancing IOs to the same LUN may be sent to different directors), the IO arriving at a director may be intercepted by the splitter running at the same director, if the volume is a distributed mirror, the IO may also be sent to another director at the mirror site and intercepted also by the splitter running at the other director.

Adding a Director to Storage with Network-Based Replication without Data Resynchronization In distributed storage environments (e.g., VPLEX®, from EMC Corporation) a director may be added while the distributed data is being replicated. However, the new director may have new splitters that do not know what to replicate and how to handle new I/Os. If I/Os are missed or lost, that information is gone forever and may be recovered only by a full resync of the volume.

In certain embodiments, such new nodes are not aware of the storage replication environment, for example, because there is no configuration information available for the new nodes. In certain embodiments, the RPA will recognize a new splitter with attached volumes at the new node and will automatically attach it. However, in such traditional replication environments, a full data sweep is required because the new splitter may have missed I/Os (i.e., the RPA will know whether I/Os have been replicated by pre-existing splitters before the new node, and its splitter, was added). In order to continue replication without disruption to the user and without requiring a full resynch, those I/Os may need to be identified. In other embodiments, the new node may not be aware of the RPAs and will not be able to perform replication.

However, example embodiments of the present invention overcome these and other deficiencies by allowing adding a director and new splitters without interruption of the replication. Directors may be added to a site, for example, for scale-out to expose additional LUNs to more hosts, or to support increased bandwidth and performance. Further, in an array upgrade scenario, such as for VPLEX®, new directors may be added before removing old ones.

Figure 8:
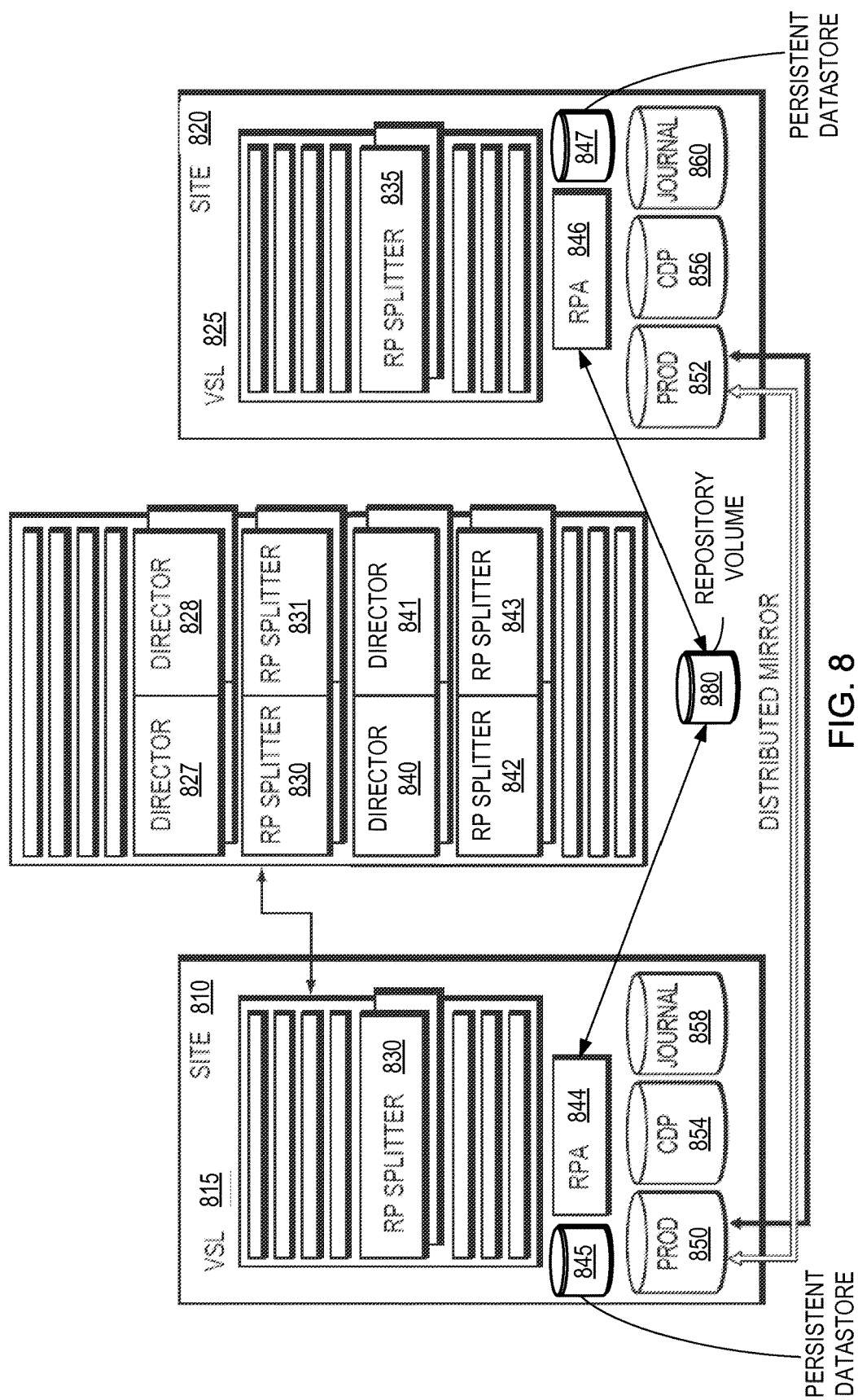
FIG. 8 is a simplified illustration of an implementation of adding new directors to distributed storage with network-based replication without data resynchronization, in accordance with an embodiment of the present invention.

FIG. 8 is a simplified illustration of an implementation of adding new directors 840, 841 to distributed storage (e.g., production volume 850, 852) with network-based replication (e.g., provided by splitters 830, 835 and RPAs 844, 846) spanning two sites 810, 820 via a VSL 815, 825 without data resynchronization, in accordance with an embodiment of the present invention. As illustrated in FIG. 8, new directors 840, 841 are added to site 810. New directors typically are added in pairs 840, 841 and, as described above, may have new splitters 842, 843 that do not know what to replicate and how to handle new I/Os.

As will be described in greater detail below, the splitters 830, 831, 835, 842, 843 may utilize a persistent datastore 845, 847 at each site 810, 820, respectively, to store persistent data (i.e., configuration and state data for the splitters 830, 831, 842, 843). In certain embodiments, the persistent datastore 845, 847 may be a volume internal to a VPLEX® array and may be accessible only to the respective splitters 830, 831, 835, 842, 843 running on the VPLEX® array. Within the persistent datastore 845, 847, the splitters 830, 831, 835, 842, 843 may maintain their persistent settings. In certain embodiments, each splitter 830, 831, 835, 842, 843 accesses only its own respective state/settings. However, in example embodiments of the present invention, splitters 830, 831, 835, 842, 843 may access state/settings information for their peer splitters, such as those internal to a VPLEX® array site (e.g., sites 810. 820).

Further, the RPAs 844, 846 in a RPA cluster may access a repository volume 880 (e.g., repository volume 645 of FIG. 6) to store persistent data (i.e., configuration and state data for the RPAs 844, 846 and for the splitters 830, 831, 835, 842, 843 attached to the cluster of RPAs 844, 846). In certain embodiments, the repository volume 880 contains configuration data for the entire system, including splitter 830, 831, 835, 842, 843 settings. In a preferred embodiment, the repository volume 880 is accessed only by the RPAs 844, 846.

In a preferred embodiment, the repository volume 880 and the persistent datastore 845, 847 are distinct storage entities accessed by their respective entities in the system (e.g., the splitters 830, 831, 835, 842, 843 for the respective persistent datastores 845, 847 and the RPAs 844, 846 for the repository volume 880). However, in other embodiments, the repository volume 880 and the persistent datastores 845, 847 may be in the same storage accessible by both the splitters 830, 831, 835, 842, 843 and the RPAs 844, 846.

Both the persistent datastores 845, 847 and the repository volume 880 may be synced regarding the splitter 830, 831, 835, 842, 843 state (i.e., the RPAs 844, 846 have access via the repository volume 880 to the settings that reflect the expected state of the splitters 830, 831, 835, 842, 843 and the splitters 830, 831, 835, 842, 843 have their state in the persistent datastores 845, 847). In example embodiments of the present invention, the splitters 830, 831, 835, 842, 843 and the RPAs 844, 846 independently update the information they can access (i.e., the splitters 830, 831, 835, 842, 843 will update the respective persistent datastores 845, 847 and the RPAs 844, 846 will update the repository volume 880). As will be described in greater detail below, a splitter 830, 831, 835, 842, 843 creates entries within the respective persistent datastore 845, 847 by deducing the contents from other splitters' entries it can find in the persistent datastore 845, 847 and the RPAs 844, 846 add a new splitter to the settings and to the repository volume 880 by deducing the settings from other splitters running on the same VPLEX array, taken from the settings as reflected in the repository volume 880. Once this is done, the splitters 830, 831, 835, 842, 843 and the RPAs 844, 846 communicate with each other and the RPAs 844, 846 will fix any differences from the current splitter state to the expected state, as described below with reference to FIG. 12.

The block diagram of FIG. 8 may be studied in combination with the flow diagrams of FIGS. 9-12.

FIG. 9 is a flow diagram illustrating an example method for adding new directors 840, 841 to a site 810 to expose LUNs in distributed storage 850, 852 with network-based replication 810, 820 without data resynchronization, in accordance with an embodiment of the present invention. In order to perform replication, configuration information for a new splitter 842, 843 for new directors 840, 841 in a distributed storage system is obtained (905). As will be described in greater detail below with reference to FIGS. 10 and 11, in certain embodiments, the splitter configuration information may be for the new splitters 842, 843 (i.e., direct) (e.g., as described below with reference to FIG. 10)

or for its peer splitters 830, 831 (e.g., (i.e., indirect) (e.g., as described below with reference to FIG. 11). Similarly, the RPAs 844, 846 may then update the repository volume 880 to add the new splitters 842, 843 by deducing the settings from other peer splitters taken from the settings as reflected in the repository volume 880. Replication then may be performed in a network-based replication system 810, 820 according to the configuration information (910) obtained for the new splitter 842, 843.

FIG. 10 is a flow diagram illustrating an example method for determining whether a persistent data store 845 includes configuration information for a new splitter 842, 843 and manipulating configuration information, in accordance with an embodiment of the present invention. Once a new splitter 842, 843 begins running on a director 840, 841, the new splitter 842, 843 starts to execute. The new splitter 842, 843 determines whether a persistent data store 845 includes configuration information (i.e., persistent data) regarding the splitter's 842, 843 configuration (1005). Persistent data may be data each splitter maintains regarding the splitters' 830, 831, 842, 843 configuration and what volumes 850 need to be protected.

If there is persistent data available for the new splitter 842, 843 at the persistent datastore 845 (1008), the new splitter 842, 843 retrieves the persistent data (1020) from the persistent data store 845 and starts handling I/Os for replicated volumes as usual (910) and no I/Os are missed. Note that, in certain embodiments, the new splitter 842, 843 does not yet have connection to the RPA 844. Accordingly, as described below, the new splitter 824, 843 determines according to a policy whether it should track I/Os or fail them.

It should be understood that, for a new splitter 842, 843 that was removed from the replication environment, such as that illustrated in FIG. 8, and later re-added, persistent data exists in the persistent data store 845. Further, it should be understood that, for a first director added to a distributed storage configuration, no configuration information for the splitters 830, 831, 842, 843 has yet been stored in the persistent data store 845. This allows the new director (e.g., new director 840, 841) to assume that, if there are other directors running (e.g., directors 827, 828), they have persistent data stored in the persistent data store 845 that may be retrieved by a new splitter 842, 843.

If the new splitter 842, 843 scans the persistent data store 845 and finds no persistent data for the new splitter 842, 843 (1007), it is likely that the new splitter 842, 843 was not running in the past, thereby allowing differentiation between the new splitter 842, 843 rebooting with state information from previous execution and the first time the new splitter 842, 843 is running. In order to determine the new splitter's 842, 843 configuration information, the new splitter 842, 843 then may retrieve information identifying peer splitters 830, 831 in the persistent data store 845 (1010). The new splitter 842, 843 then may extract from the identified peer splitters 830, 831 configuration information for those peer splitters 830, 831 (1015).

Figure 11:
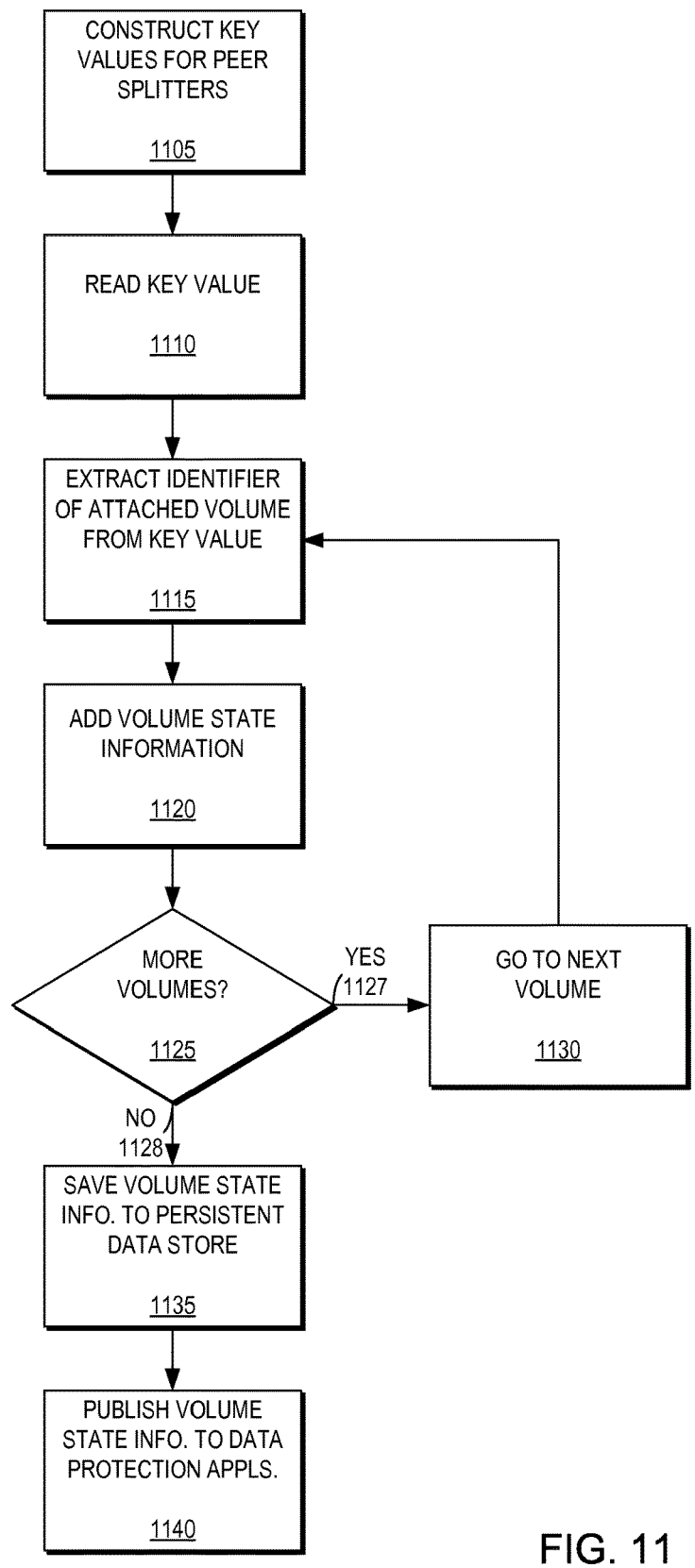
FIG. 11 is a flow diagram illustrating an example method for extracting configuration information from peer nodes, in accordance with an embodiment of the present invention.

FIG. 11 is a flow diagram illustrating an example method for extracting configuration information for a peer splitter 830, 831 from a persistent datastore 845, in accordance with an embodiment of the present invention. As will be described in greater detail below, when configuration information for the peer splitters 830, 831 is obtained from the persistent datastore 845 (i.e., indirect), a configuration for the new splitter 842, 843 may be inferred or otherwise determined from the configuration information for the peer splitters 830, 831. Splitter and attached volume information may be stored in the persistent datastore 845, 847 as an object hierarchy serialized for the storage. For example, the objects may support fast query mechanisms such as key-value pair lookups. Thus, the new splitter 842, 843 creates its own state from the configuration information of the peer splitters 830, 831 (i.e., the new splitter 842, 843 creates a variant of the configuration information for the peer splitters 830, 831 instructing the new splitter 842, 843 regarding what I/Os it should split and what cluster of replication appliances (RPAs) 844, 846 it belongs to).

For example, the new splitter 842, 843 may construct key values for the peer splitters 830, 831 (1105) and look for information identifying the attached volumes (e.g., production volume 850, 852) for which I/Os are being split by the peer splitters 830, 831. Note that, directors are typically added in pairs and the peer director of the pair may not be considered a valid director for extracting value information from the key-value pairs because it is expected to undergo the same discovery mechanism at the same time.

If key-value pairs exist in the configuration information for the peer splitters 830, 831 extracted from the persistent data store 845, the new splitter 842, 843 may, for each key value, read the key value (1110) and extract from it a list of attached volumes (1115) (e.g., production volume 850) for which I/Os are being split by the peer splitter 830, 831. For each volume, the splitter 842, 843 then adds the volume (1120) to the configuration state for the new splitter 842, 843 in the persistent data store 845, with the volume's state determined according to a policy that specifies what the new splitter 842, 843 should do with the volume should the new splitter 842, 843 lose connectivity to the central logic provided by the RPA 844 in the network-based replication system. It should be understood that the policy is maintained as part of the volume state information retrieved from the persistent data store 845 (1120), and is kept per volume replicated.

The policy may be non-blocking or blocking.

A non-blocking policy is a policy in which the splitter should enter marking on host (MOH) mode upon disconnection from the RPA (i.e., the new splitter 842, 843 should allow I/Os and keep track internally of the metadata arriving for each such I/O that flowed but not sent to the central replication engine (i.e., RPAs) until connectivity is restored). The new splitter 842, 843 then may go into split mode, upon a request from the central logic executing on RPA 844. The RPA 844 may then query the new splitter 842, 843 to provide information regarding I/Os it tracked while in MOH mode. The metadata for these I/Os kept in the new splitter 842, 843 memory may be sent to the RPA 844 and used by the RPA 844 to resync the volumes protected by the new splitter 842, 843 where I/Os arrived at the new splitter 842, 843 but were not sent to the RPA 844.

A blocking policy is a policy in which the splitter should enter fail all mode upon disconnection from the RPA (i.e., all write and read I/Os intercepted by the new splitter 842, 843 are failed to the host (e.g., hosts 104, 116 of FIG. 1), but other SCSI commands (e.g., read capacity) are served). Further, it should be noted that the dirty bit for these volumes added to the persistent data store 845 need not be set because I/Os were not missed by this new splitter 842, 843 and once I/Os are handled by the splitter the dirty bit needs to be handled normally.

The volume state information is then stored persistently (1135) in the persistent data store 845. Further, once communication with the RPAs 844, 846 is established, the state is published to them (1140) via a communication mechanism between the new splitter 842, 843 and the RPAs 844, 846.

This communication mechanism may be used by the splitters 830, 831, 835, 842, 843 to report their respective state to the RPAs 844, 846 and by the RPAs 844, 846 to convey commands to the splitters 830, 831, 835, 842, 843.

The RPAs 844, 846 also understand that a new splitter 842, 843 has appeared in the configuration, such as via, for example, a heartbeat mechanism existing in the system (e.g., provided by the splitters). The new splitter 842, 843 now has its state configured from the repository volume 880 based on configuration information for its peer splitters 835.

It should be understood that the methods of checking the persistent datastore 845 by the new splitter 842, 843 for configuration information for the new splitter 842, 843 and checking the repository volume 880 by the RPA 844 for peer splitter 835 configuration information is logically the same, but based on different sources of information (e.g., persistent datastore 845 and repository volume 880). A single difference is that the RPAs 844, 846 do not account for the policy of each volume when updating its persistent state information, but rather use the exact same state as retrieved from the repository volume.

In certain embodiments, I/Os may not be allowed to flow through the new director 840, 841 until the new splitter 842, 843 has completed its initial establishment. The new splitter 842, 843 may have a mechanism to provide a notification to, for example, VPLEX®, that it has finished its initialization. Until the storage is notified, it will not accept I/Os, thereby allowing the new splitter 842, 843 to keep track of all I/Os to prevent requiring a full resync of the protected volumes. Once the initialization is complete, the new splitter 842, 843 may notify the storage that it is complete and start processing I/Os.

In another embodiment in which a splitter, for example splitter 830, had volumes in MOH mode, the splitter 830 was restarted (e.g., due to a reboot) and, during the restart, the splitter's 830 persistent data in the persistent data store 845 was erased. Once the splitter 830 recovers, it will assume that it is a new splitter 830 and will perform the method described to deduce its persistent state information from peer splitter's state. This way, the volumes with the dirty bit marked for them (i.e., before the restart) will not cause a full sweep, even though a full sweep is required due to the loss of the in-memory marking information maintained by the splitter for these volumes. To address this inconsistency, in-memory marking information may be flushed prior to the restart to a persistent data store (e.g., persistent datastore 845 or another dedicated datastore), from which it can be recovered by the splitter 830 during its initialization process.

Figure 12:
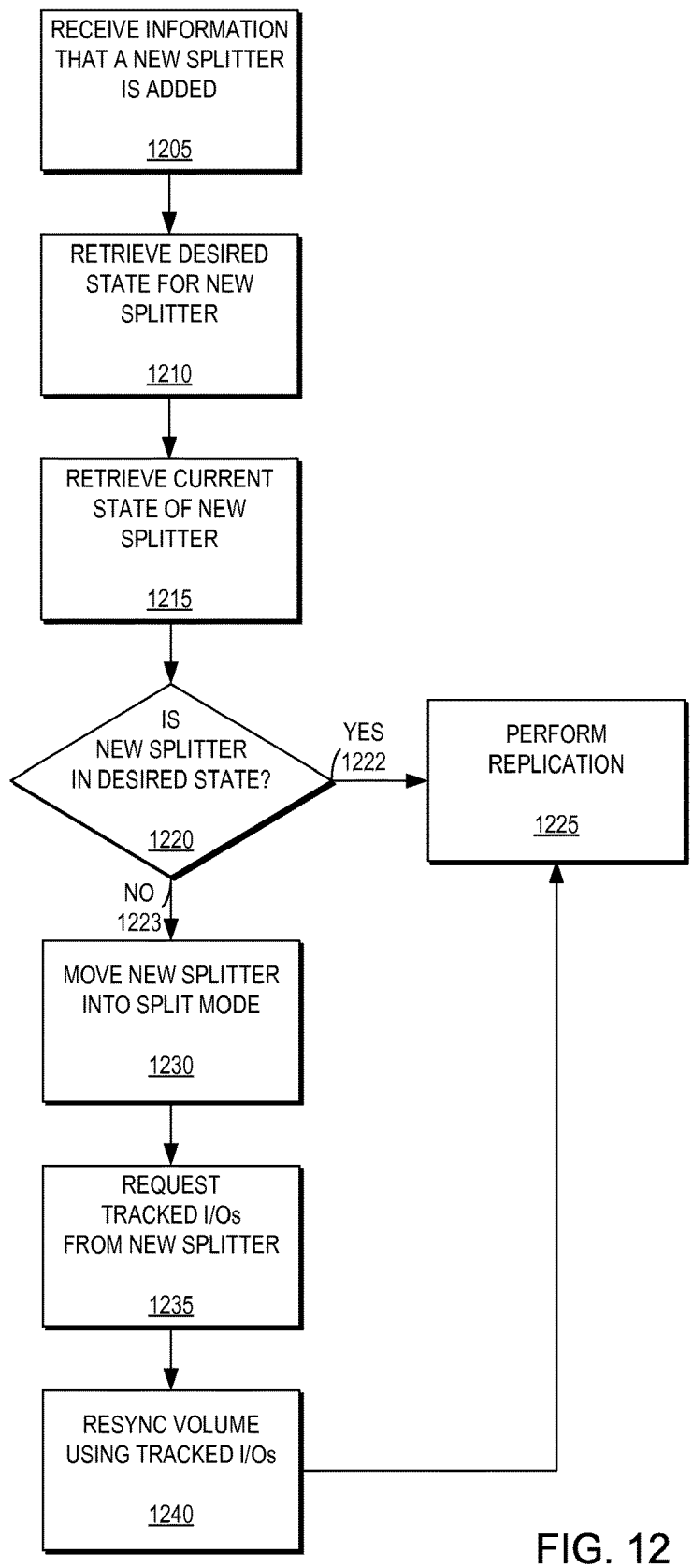
FIG. 12 is a flow diagram illustrating an example method for synchronizing I/Os received by a new splitter.

FIG. 12 is a flow diagram illustrating an example method for synchronizing I/Os received by the new splitter 842, 843. As illustrated in FIG. 12, with reference to FIG. 8, once a new splitter 842, 843 has established its initial state (e.g., as illustrated in FIGS. 9-11), the new splitter 842, 843 has the configuration information in its persistent datastore 845 necessary for the new splitter 842, 843 to split I/Os (from the persistent datastore 845). However, in certain embodiments, the RPAs 844, 846 do not yet replicate I/Os that have been received by the new splitter 842, 843 (e.g., such as those received while the new splitter 842, 843 is in MOH mode). This ensures that no I/Os go through the new splitter 842, 843 without being properly replicated by the RPAs 844, 846.

Accordingly, the RPA 844 receives information that a new splitter 842, 843 was added to the system (1205) and starts communicating with the new splitter 842, 843 by retrieving the settings/configuration that a splitter needs to be in (e.g., the volumes that need to be replicated) (1210) and the current state of the new splitter 842, 843 (1215). The RPA then compares the desired settings/state against the current state of the new splitter 842, 843 (1220). If the new splitter 842, 843 is in the desired state (1222), the RPA 844 replicates I/Os, as described above (1225). However, if the new splitter 842, 843 is not in the desired state (e.g., for a new splitter 842, 843 in which volumes are attached but for which replication is not in effect (i.e., the new splitter 842, 843 is in MOH mode and is tracking I/Os) (1223), the RPA 844 may move the splitter 842, 843 into split mode (i.e., replicate I/Os) (1230) and request from the new splitter 842, 843 the data of the I/Os that the new splitter 842, 843 accumulated while tracking them (1235). The RPA 844 then uses this information to resync just this portion of the volume (e.g., where I/Os arrived at the new splitter 842, 843 but were not sent to the RPA 844) (1240). Splitting I/Os may then occur normally (1225), as described above because the RPA 844 has filled in any gaps from the MOH data received from the new splitter 842, 843.

Figure 13:
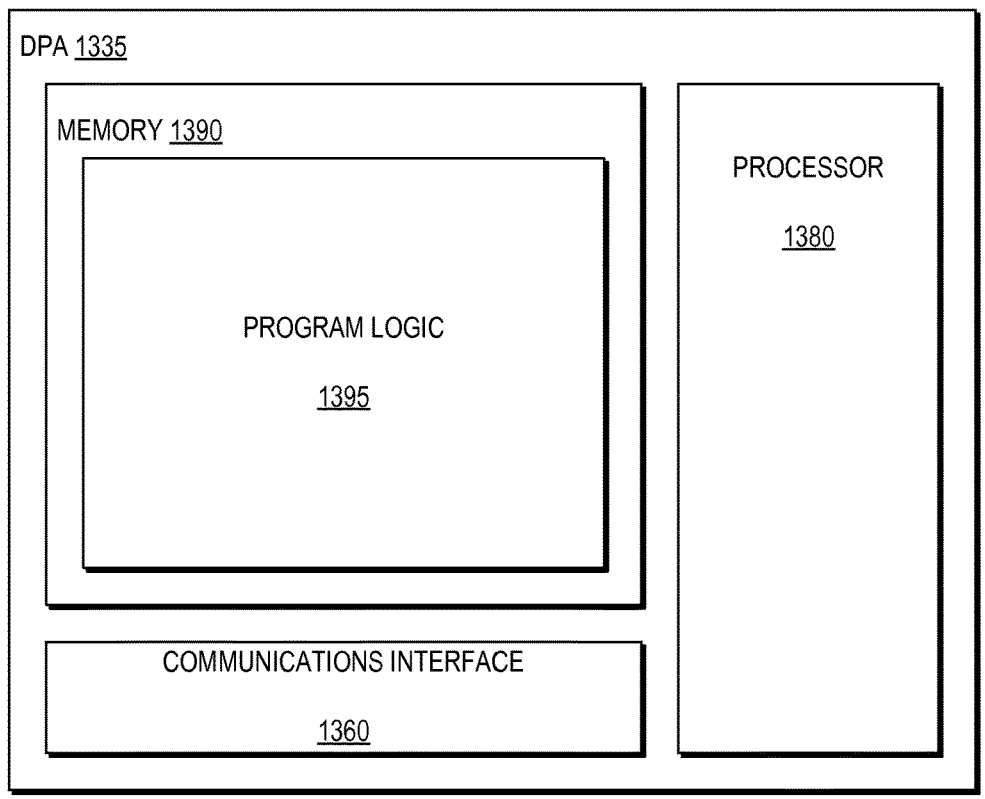
FIG. 13 is a block diagram of an example embodiment apparatus according to the present invention.
Figure 14:
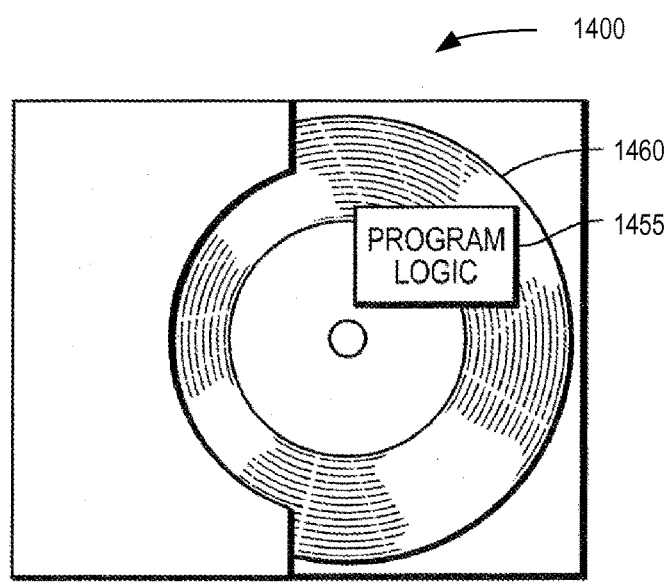
FIG. 14 is an illustration of an example embodiment of the present invention as embodied in program code.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 13, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine. FIG. 14 shows Program Logic 1455 embodied on a computer-readable medium 1460 as shown, and wherein the Logic is encoded in computer-executable code configured for carrying out the reservation service process of this invention and thereby forming a Computer Program Product 1400.

The logic for carrying out the method may be embodied as part of the aforementioned system, which is useful for carrying out a method described with reference to embodiments shown in, for example, FIGS. 1-12. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A computer-implemented method for performing data replication without resynchronization comprising:
    receiving information that a splitter associated with a director has been added to a distributed storage system, wherein the director includes a construct to expose one or more volumes in the distributed storage system, and wherein the splitter does not include any configuration information regarding a storage replication environment;
    obtaining the configuration information for the splitter associated with the director added to and associated with the scale-out of the distributed storage system enabling mirroring between a plurality of geographically disparate sites in the distributed storage system;
    differentiating between the splitter rebooting with information from previous execution after which the splitter was removed and re-added to the replication system and a first time the splitter was run in the replication system; and
    performing replication in a network-based replication system according to the configuration information, wherein the adding of the splitter does not require data resynchronization.

2. The method of claim 1 wherein obtaining configuration information for a new splitter in a distributed storage system comprises:
    determining whether a persistent data store includes configuration information for the new splitter; and
    if the persistent data store includes configuration information for the new splitter, retrieving the configuration information for the new splitter.

3. The method of claim 2 further comprising, if the persistent data store does not include configuration information for the new splitter:
    retrieving information identifying peer splitters of the new splitter in the distributed storage system from a repository; and
    extracting configuration information for the peer splitters in the distributed storage system from the repository.

4. The method of claim 3 wherein retrieving information identifying peer splitters of the new splitter in the distributed storage system from a repository comprises scanning the repository for key-value pairs identifying peer splitters.

5. The method of claim 4 further comprising:
    reading a key value; and
    extracting from the key value an identifier of at least one attached volume of the one or more volumes.

6. The method of claim 5 further comprising, for each identified volume, adding the identified volume to the new splitter, with a state for each identified volume determined according to its respective policy.

7. The method of claim 6 further comprising:
    if the volume policy is non-blocking, configuring the splitter to enter marking on host (MOH) mode upon disconnection from a replication appliance; and
    if the volume policy is blocking, configuring the splitter to enter a fail all mode upon disconnection from the replication appliance.

8. The method of claim 7 further comprising:
    saving the volume state information to the persistent data store; and
    publishing the volume state information.

9. The method of claim 1 wherein performing replication in a network-based replication system according to the configuration information comprises:
    determining whether the new splitter is in a desired state; and
    if the new splitter is in the desired state, replicating I/Os received at the new splitter.

10. The method of claim 9 wherein determining whether the new splitter is in a desired state comprises:
    retrieving information regarding the desired state for the new splitter;
    retrieving information regarding a current state for the new splitter; and
    determining whether the current state of the new splitter is the desired state for the new splitter.

11. The method of claim 9 further comprising, if the new splitter is not in the desired state:
    moving the splitter to a split mode;
    requesting I/Os tracked by the new splitter; and
    resynchronizing attached volumes using the tracked I/Os.

12. The method according to claim 1, further including not allowing IO operations to flow through the director until the splitter has completed initialization.

13. An apparatus comprising:
    a processor; and
    memory encoded with instructions that, when executed by the processor, cause the apparatus to perform the operations of:
        receiving information that a splitter associated with a director has been added to a distributed storage system, wherein the director includes a construct to expose one or more volumes in the distributed storage system, and wherein the splitter does not include any configuration information regarding a storage replication environment;
        obtaining the configuration information for the splitter associated with the director added to and associated with the scale-out of the distributed storage system enabling mirroring between a plurality of geographically disparate sites in the distributed storage system;
        differentiating between the splitter rebooting with information from previous execution after which the splitter was removed and re-added to the replication system and a first time the splitter was run in the replication system; and
        performing replication in a network-based replication system according to the configuration information, wherein the adding of the splitter does not require data resynchronization.

14. The apparatus of claim 13 wherein obtaining configuration information for a new splitter in a distributed storage system comprises:
    determining whether a persistent data store includes configuration information for the new splitter; and
    if the persistent data store includes configuration information for the new splitter, retrieving the configuration information for the new splitter.

15. The apparatus of claim 14 further comprising, if the persistent data store does not include configuration information for the new splitter:
    retrieving information identifying peer splitters of the new splitter in the distributed storage system from a repository; and
    extracting configuration information for the peer splitters in the distributed storage system from the repository.

16. The apparatus of claim 15 wherein retrieving information identifying peer splitters of the new splitter in the distributed storage system from a repository comprises scanning the repository for key-value pairs identifying peer splitters.

17. The apparatus of claim 16 further comprising:
  reading a key value; and
  extracting from the key value an identifier of at least one attached volume of the one or more volumes.

18. The apparatus of claim 17 further comprising, for each identified volume, adding the identified volume to the new splitter, with a state for each identified volume determined according to its respective policy.

19. The apparatus of claim 18 further comprising:
  if the volume policy is non-blocking, configuring the splitter to enter marking on host (MOH) mode upon disconnection from a replication appliance; and
  if the volume policy is blocking, configuring the splitter to enter a fail all mode upon disconnection from the replication appliance.

20. The apparatus of claim 13 wherein performing replication in a network-based replication system according to the configuration information comprises:
  determining whether the new splitter is in a desired state; and
  if the new splitter is in the desired state, replicating I/Os received at the new splitter.

21. The apparatus of claim 20 wherein determining whether the new splitter is in a desired state comprises:
  retrieving information regarding the desired state for the new splitter;
  retrieving information regarding a current state for the new splitter; and
  determining whether the current state of the new splitter is the desired state for the new splitter.

22. The apparatus of claim 20 further comprising, if the new splitter is not in the desired state:
  moving the splitter to a split mode;
  requesting I/Os tracked by the new splitter; and
  resynchronizing attached volumes using the tracked I/Os.

23. A computer program product having a non-transitory computer readable storage medium with instructions encoded thereon that, when executed by a processor of a computer, causes the computer to perform the operations of:
  receiving information that a splitter associated with a director has been added to a distributed storage system, wherein the director includes a construct to expose one or more volumes in the distributed storage system, and wherein the splitter does not include any configuration information regarding a storage replication environment;
  obtaining the configuration information for the splitter associated with the director added to and associated with the scale-out of the distributed storage system enabling mirroring between a plurality of geographically disparate sites in the distributed storage system; differentiating between the splitter rebooting with information from previous execution after which the splitter was removed and re-added to the replication system and a first time the splitter was run in the replication system; and
  performing replication in a network-based replication system according to the configuration information, wherein the adding of the splitter does not require data resynchronization.

* * * * *